United States Patent
Nager et al.

(10) Patent No.: US 11,915,481 B1
(45) Date of Patent: Feb. 27, 2024

(54) CAPTURING AND ANALYZING SECURITY EVENTS AND ACTIVITIES AND GENERATING CORRESPONDING NATURAL LANGUAGE DESCRIPTIONS

(71) Applicant: Sunflower Labs Inc., San Carlos, CA (US)

(72) Inventors: Yannik S. Nager, Zürich (CH); Christian Eheim, Fällanden (CH); Alexander S. Pachikov, San Carlos, CA (US)

(73) Assignee: Sunflower Labs Inc., San Carlos, CA (US)

( * ) Notice: Subject to any disclaimer, the term of this patent is extended or adjusted under 35 U.S.C. 154(b) by 417 days.

(21) Appl. No.: 17/194,386

(22) Filed: Mar. 8, 2021

Related U.S. Application Data

(60) Provisional application No. 62/990,659, filed on Mar. 17, 2020.

(51) Int. Cl.
| | |
|---|---|
| *G06K 9/00* | (2022.01) |
| *G06V 20/40* | (2022.01) |
| *G06F 40/56* | (2020.01) |
| *G08B 13/196* | (2006.01) |
| *G06F 40/35* | (2020.01) |
| *G06F 18/2431* | (2023.01) |

(52) U.S. Cl.
CPC .......... *G06V 20/41* (2022.01); *G06F 18/2431* (2023.01); *G06F 40/35* (2020.01); *G06F 40/56* (2020.01); *G08B 13/19613* (2013.01); *G06V 20/44* (2022.01)

(58) Field of Classification Search
CPC .... G06V 20/41; G06V 20/44; G06F 18/2431; G06F 40/35; G06F 40/56; G08B 13/19613
See application file for complete search history.

(56) References Cited

U.S. PATENT DOCUMENTS

| | | | |
|---|---|---|---|
| 2017/0052148 A1* | 2/2017 | Estevez | G01N 29/075 |
| 2018/0069838 A1* | 3/2018 | Lee | H04L 63/0428 |
| 2020/0327682 A1* | 10/2020 | Nater | G06V 10/255 |
| 2021/0176317 A1* | 6/2021 | Yeoh | G06F 40/20 |
| 2021/0279603 A1* | 9/2021 | Teran Matus | G06V 20/40 |

* cited by examiner

*Primary Examiner* — Dhaval V Patel
(74) *Attorney, Agent, or Firm* — Muirhead and Saturnelli, LLC

(57) ABSTRACT

Detecting security events and generating corresponding natural language descriptors includes monitoring an area to capture data corresponding to moving objects in the area, classifying the moving objects, generating events based on classifying the moving objects, building an event graph by connecting related ones of the events, using the event graph to detect security events, and building natural language activity descriptors for the security events of the event graph using natural language templates to convert the security events to natural language. The natural language security descriptors may be presented using a verbal request to a voice-enabled assistant, a mandatory notification by the voice-enabled assistant, periodic reports and/or conversational style notifications in a visual format. Data may be captured using sensors, video streams from at least one camera vehicle, smart home devices, presence detection mechanisms, and/or weather data/forecasts. The sensors may include PIR, vibration, light, laser, ultrasonic, seismic, and/or radar sensors.

26 Claims, 8 Drawing Sheets

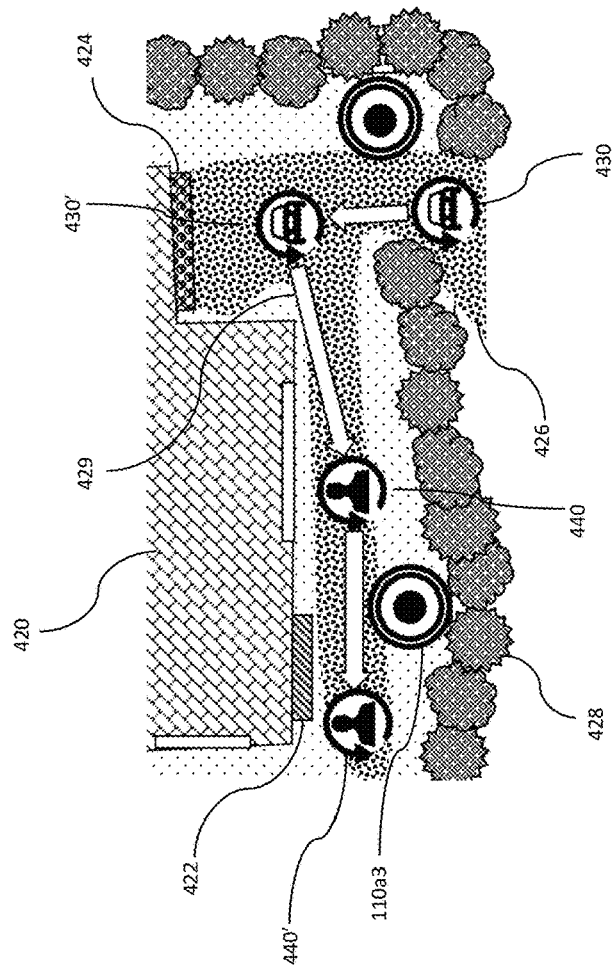
FIG. 4B. Event types: connected events (example 1)
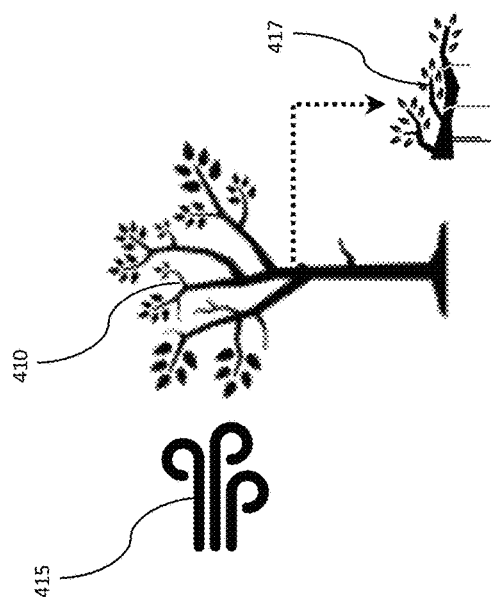
FIG. 4A. Event types: singular event

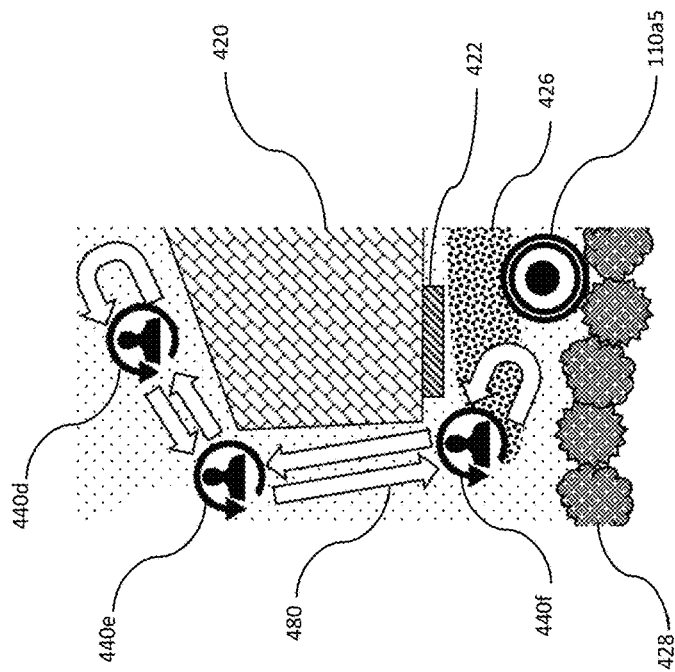
FIG. 4D. Event types: repetitive events
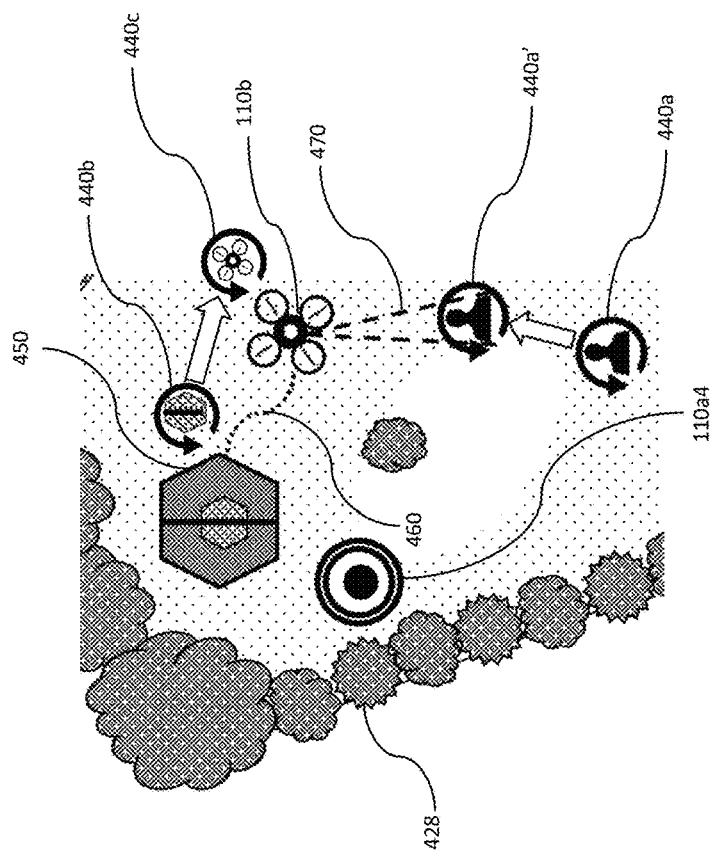
FIG. 4C. Event types: connected events (example 2)

CAPTURING AND ANALYZING SECURITY EVENTS AND ACTIVITIES AND GENERATING CORRESPONDING NATURAL LANGUAGE DESCRIPTIONS

CROSS-REFERENCE TO RELATED APPLICATIONS

This application claims priority to U.S. Prov. App. No. 62/990,659, filed on Mar. 7, 2020, and entitled "CAPTURING, ANALYZING AND GENERATING NATURAL LANGUAGE DESCRIPTIONS FOR SECURITY EVENTS AND ACTIVITIES", which is incorporated herein by reference.

TECHNICAL FIELD

This application is directed to the field of information processing in the area of security systems, and more particularly to analyzing and generating security events and activities and generating natural language descriptions of the security events and activities.

BACKGROUND OF THE INVENTION

Following increased concerns about general and residential security, the market for home security systems is growing at accelerated pace. According to industry forecasts, the worldwide market for home security systems was valued at approximately $60 billion in 2019 and is expected to reach $74.75 billion by 2023 with a compound annual growth rate of 10.4%. North America represents the largest part of the market. Key players in the electronic security system products and services in the United States, are ADT, Vivint Inc., Nest Secure, Ring Alarm, SimpliSafe and many other companies, of which ADT is by far the largest vendor with over seven million installed units.

Electronic security requirements and solutions significantly vary for different types of dwellings ranging from tower blocks and regular apartment blocks to townhomes and private homes. Accordingly, security system providers have a large spectrum of offerings of electronic security products, systems and services, varying from basic alarms to video surveillance (CCTV) solutions to multi-component solutions with different types of sensors and inspection capabilities. Such systems and solutions are implementing portions of the "Six D" security metaphor: Deter, Detect, Dispatch, Delay, Deny, Defend.

Differentiated assessments of market size for various residential security products must consider the existing demographics and property distribution by categories. According to the recent census data, there are roughly 76 million free-standing, owner or renter occupied, single family homes in the US, of which almost 56 million are located in lightly populated areas, outside of city centers and dense urban environments. Less than one in three of such properties currently have any type of a home security system, representing a significant unsatisfied demand for such systems in the US.

Recent developments in home security systems and services are gradually shifting their focus from video surveillance systems mounted solely on the house to protecting property security perimeter. Such protection often employs various types of sensors capable of detecting and distinguishing between different kinds of objects crossing the security perimeter and entering the property. For example, top recommendations by Amazon.com, Inc. issued in February 2020 for self-made home security systems with perimeter protection, include 12 sensors from six vendors, dominated by Guardline Wireless Driveway Alarm motion sensors. PIR (Passive Infrared), light, laser, tomographic, microwave, ultrasonic, vibration, seismic and other categories of motions sensors are increasingly used in home security systems. Camera vehicles for property inspection, like the Bee drone introduced by Sunflower Labs, Inc., paired with cloud solutions and smartphone-based mobile applications, are finding their way into integrated home security systems.

Some of the most challenging and least addressed problems faced by the new generation of home security systems are related to proper identification, recognition and reporting of security events. Vendor information and customer feedback on perimeter protection and other types of home security systems indicate numerous potential and factual confusions and errors resulting from misidentification of objects and security threats, from overlapping of security perimeter with neighboring properties, etc. Additionally, multiple alert tones used in various systems, even when such tones are customizable, cannot adequately reflect the multiplicity and the complex relations between highly diverse security situations, threats and damages.

Accordingly, it is desirable to be able to analyze security events and activities in security systems to generate and deliver natural language reports and notifications about such events.

SUMMARY OF THE INVENTION

According to the system described herein, detecting security events and generating corresponding natural language descriptors includes monitoring an area to capture data corresponding to moving objects in the area, classifying the moving objects, generating events based on classifying the moving objects, building an event graph by connecting related ones of the events, using the event graph to detect security events, and building natural language activity descriptors for the security events of the event graph using natural language templates to convert the security events to natural language. The natural language security descriptors may be presented using a verbal request to a voice-enabled assistant, a mandatory notification by the voice-enabled assistant, periodic reports and/or conversational style notifications in a visual format. Data may be captured using sensors, video streams from at least one camera vehicle, smart home devices, presence detection mechanisms, and/or weather data and forecasts. The sensors may include PIR, vibration, light, laser, ultrasonic, seismic, and/or radar sensors. Classifying the moving objects may include determining a dynamic sensor profile for each of the moving objects. The dynamic sensor profile may include object size, object velocity and object vibration pattern. The dynamic sensor profile may be input to a pre-trained object classifier that returns an object category corresponding to human, animal, vehicle, or uncategorized. Each of the events may have attributes associated therewith and the attributes may include event time, event location, an event motion vector, an event object category, associated internal objects and associated external objects. The attributes may be used to determine whether a particular one of the events is classified as a security event. Related ones of the events may be connected based in part on timing between the events. The event graph may be used to select activities that are monitored to determine if events corresponding to the activities are security events. The natural language templates may include a plurality of constructs. Each of the constructs may be a time construct, a location construct, an object type construct, an action construct, a temporal expression, a modifier or a logical connector. Using the event graph to detect security events may include classifying events as connected events that are causally connected or singular events that are not and connected events may be more likely to be security events. At least some repetitive events may be classified as connected events. Connectivity rules may require that connected events occur within a relatively narrow time window that may be 30 seconds or may be three times an average interval between adjacent events within a same activity. Only key events may be used to build natural language activity descriptors for the security events. Security events may include a vehicle driving on to the area and a person exiting the vehicle and walking toward a front door of a house in the area. Security events may include a person entering the area and walking back and forth in the area. Security events may include a person approaching or interacting with a predefined security hazard hotspot that is within the area. A predefined security hazard hotspot may include a property gate, a house door, a garage door, a window, and/or a doorbell. At least some security events may correspond to activities that are initially suspended and subsequently resumed. An unmanned aerial vehicle with a camera may be dispatched to more closely inspect security events.

According further to the system described herein, a non-transitory computer readable medium contains software that detects security events and generates corresponding natural language descriptors. The software includes executable code that monitors an area to capture data corresponding to moving objects in the area, executable code that classifies the moving objects, executable code that generates events based on classifying the moving objects, executable code that builds an event graph by connecting related ones of the events, executable code that uses the event graph to detect security events, and executable code that builds natural language activity descriptors for the security events of the event graph using natural language templates to convert the security events to natural language. The natural language security descriptors may be presented using a verbal request to a voice-enabled assistant, a mandatory notification by the voice-enabled assistant, periodic reports and/or conversational style notifications in a visual format. Data may be captured using sensors, video streams from at least one camera vehicle, smart home devices, presence detection mechanisms, and/or weather data and forecasts. The sensors may include PIR, vibration, light, laser, ultrasonic, seismic, and/or radar sensors. Classifying the moving objects may include determining a dynamic sensor profile for each of the moving objects. The dynamic sensor profile may include object size, object velocity and object vibration pattern. The dynamic sensor profile may be input to a pre-trained object classifier that returns an object category corresponding to human, animal, vehicle, or uncategorized. Each of the events may have attributes associated therewith and the attributes may include event time, event location, an event motion vector, an event object category, associated internal objects and associated external objects. The attributes may be used to determine whether a particular one of the events is classified as a security event. Related ones of the events may be connected based in part on timing between the events. The event graph may be used to select activities that are monitored to determine if events corresponding to the activities are security events. The natural language templates may include a plurality of constructs. Each of the constructs may be a time construct, a location construct, an object type construct, an action construct, a temporal expression, a modifier or a logical connector. Using the event graph to detect security events may include classifying events as connected events that are causally connected or singular events that are not and connected events may be more likely to be security events. At least some repetitive events may be classified as connected events. Connectivity rules may require that connected events occur within a relatively narrow time window that may be 30 seconds or may be three times an average interval between adjacent events within a same activity. Only key events may be used to build natural language activity descriptors for the security events. Security events may include a vehicle driving on to the area and a person exiting the vehicle and walking toward a front door of a house in the area. Security events may include a person entering the area and walking back and forth in the area. Security events may include a person approaching or interacting with a predefined security hazard hotspot that is within the area. A predefined security hazard hotspot may include a property gate, a house door, a garage door, a window, and/or a doorbell. At least some security events may correspond to activities that are initially suspended and subsequently resumed. An unmanned aerial vehicle with a camera may be dispatched to more closely inspect security events.

The proposed system captures data from multiple sources, such as sensors, multicopter inspections, smart home devices, presence and weather information, processes data to identify security events and determine the type, location and timing of the events, monitors event progress, builds event graphs and analyzes the graphs to determine clusters of events and associated activities based on spatial, temporal and semantic associations between events, builds activity descriptors, converts the activity descriptors into natural language descriptions of activities and periodically presents notifications or reports to the property owner (or his agent) in a visual and/or synthesized audio format.

The proposed system includes the following components representing different phases of the system workflow:
1. Data capturing
2. Object classification
3. Event generation
4. Building and analyzing an Event Graph
5. Identifying and monitoring activities
6. Conducting semantic analysis and building activity descriptors
7. Building activity descriptions in natural language
8. Reporting Each of the eight components is explained below as follows:

Data capturing. The system continuously monitors the property within an outer perimeter of the property and possibly in close vicinity (such as a road adjacent to the property) and collects various types of data—in the first place, information on moving objects with a potential to raise security threats. The system may employ various data capturing mechanisms:
  (i) different types of sensors (PIR, vibration, light, laser, ultrasonic, seismic, radar, etc.), potentially assembled in sensor units, distributed across the property and measuring size, position, velocity and other parameters of moving objects (humans, vehicles, animals and other objects);
  (ii) video streams from camera vehicles, such as multicopters (a.k.a. drones or UAVs—Unmanned Aerial Vehicles), used for property inspections;

(iii) smart home devices that may also be supplied with sensors, alarms and other detection and signaling means;

(iv) presence detection may include, for example, home based Wi-Fi networks identifying mobile devices, such as a smartphone; it may be a known mobile device (an owner, an invited guest, a friend, a contractor, etc.) or an unknown mobile device, which may lead to different paths of assessing security threats.

(v) current weather data and weather forecasts; for example, strong winds or heavy rains may move objects on the property.

Object classification. Once the data capturing component has detected a new external object on the property (or a previously detected object in a new position and captured by partially or completely different sensors compared with the first detection), the system may attempt to identify and classify the object; below is an example of the identification and classification process:

(a) A dynamic sensor profile for the new object may be built, including object size (for instance, object height, measured by an array of sensors with their capturing zones tilted down/straight/up), velocity and vibration pattern.

(b) Smart home, presence, weather and other captured data related to the new object may be added to the sensor profile.

(c) The combination of the captured and processed data may form an input to a pre-trained object classifier, which returns an object category, such as human, animal, vehicle, uncategorized object—a branch falling from a tree under a heavy wind or a splash in the pool from a stone thrown by a child, or ambient noise, such as shrubs moving in the breeze or a fence vibrating when vehicles are passing by the property.

Event generation. A security event may be associated with an external object (human, animal, vehicle, uncategorized object) or an internal object (camera vehicle dispatched for inspection, an owner or a member of an owner's family moving across the property, a doorbell or other signal, etc.) or both. A security event may have the following key object attributes: time, location on the property map, motion vector, object category, associated internal or external objects.

For example, if a car is entering the property's driveway, such an external object is characterized by a time of the event, a position of the car, the 'vehicle' category and the sensor unit(s) that have detected the car at that moment and in that position. In case the car stops, and a person comes out of the car and walks toward the front door, the person is characterized by the time, position, the motion vector (from the driveway to the front door), the 'human' category, the sensor units (same or different with those used to detect the car) capturing the person and, if the person comes in proximity with a designated property's security hazard hotspot(s), by the relevant hotspot(s). If a camera vehicle, such as a multicopter, has been dispatched to capture a video of an external object on the property and leaves its landing platform, a corresponding multicopter event is characterized by the time, position and an associated internal object of the landing platform. If the camera vehicle captures images of the object, the event might be augmented by the objects detected in the images.

The system may use a set of criteria based on various object attributes to determine whether the emergence and behavior of certain dynamic objects on the property leads to generation of a security event. Such determination is based on the location of a new object on the property map, timing, object category and interaction of the new object with internal objects and whether the new object indicates a potential security threats that warrant further monitoring of the object. Thus, in the above example of a car entering a property and a person walking across the property, if either a car or a driver (passenger) have been identified by the presence detection system, the system may identify the person as an owner's friend, invited guest, contractor, etc., and the security event may be discarded (although the security event may be still monitored for reporting and archiving purposes without issuing instant alerts); otherwise, a security event may be generated and stored for further processing. In another example, if a non-identified individual rings a doorbell, the system may not only generate a security event but may also elevate a security hazard level of the system and respond with an associated security monitoring event by dispatching a vehicle to capture video of the individual.

Building and analyzing an Event Graph. Many security events may be grouped into dynamic and causal chains, representing movement of certain objects across the property, interaction of the objects with each other and with internal objects and demonstrating growing or declining security threats, requiring proper monitoring and other actions. At the core of such monitoring lies an Event Graph, showing dynamic and semantic progression and interaction between events and objects.

For the purpose of monitoring, security events may be categorized as follows:

A. Singular events—sporadic, non-dynamic events that do not progress to a noticeable extent in time or by location. Examples include a tree, or a branch fallen by a strong wind or a splash from an object dropped in the pool.

B. Connected events—dynamic events that follow each other in time and/or follow each other causally, the main body of nodes of the Event Graph, for example:

Subsequent positions of a moving object discovered by different sensor units. Security events corresponding to a couple of adjacent positions may be connected if the security events are consistent with an ability of an object to reach a second position from a first one with an estimated object speed within a time interval separating the events.

A car stopping on a property's driveway, followed by a person emerging from the car and walking across the property. The security event corresponding to the stopping car may be connected to the security event reflecting the first captured individual's position based on various criteria—for example, if the car was the only possible explanation of the captured position/time of the person who has not been located previously on the property.

A sequence of events describing the functioning of an UAV, dispatched for inspecting an object whose security events reach a certain level of security threat, may be connected both within the trajectory of the UAV and with the external events. For example, the beginning event of the mission when the UAV departs from its landing platform may be connected to the starting event of the proper inspection when the inspected object first appears in the UAV camera's field of view. At the same time, the aforementioned beginning event may be connected with the external event that caused the flight (the event associated with the external object raising security threat level), while the starting event of the proper inspection may be connected with another external event describing the inspected object at that point in time.

Connectivity rules between events direct the structure of the Event Graph. The connectivity rules may often be time sensitive, as shown by the above examples: in addition to following the connectivity logic explained in the previous example, two connected events should occur, for the most part, within a relatively narrow time window (for example, 30 seconds or three times an average interval between adjacent events within the same activity—see below on identifying and monitoring activities). If a security event, initially added to the Event Graph, is not followed by another event that follows the first event (chronologically or casually) within a reasonable timeframe, then the added event may instantly acquire the singular status, as explained and illustrated in section A above. If no new security events at all occurred within such time window (an inactivity threshold), the current connected component of the Event Graph may be closed, so that the first future event may start a new component of the Event Graph.

There is, however, a notable exception from the Event Graph decomposition into components separated by inactivity intervals of the predefined (or larger) length. Certain types of events may belong to suspended activities that may be resumed significantly later. For example, a racoon may enter the property in the daytime, sleep under a fence and start digging a trench in the nighttime. Therefore, the system may attempt associating some of the future event nodes with origins thereof in previous components, and vice versa.

In parallel with discovering new objects and connections and building the Event Graph, the system processes portions of the graph, such as connected components, attempting to cluster the connected components structurally and semantically.

Identifying and monitoring activities. The purpose of clustering the Event Graph is the identification and monitoring of activities defined as sequences of events, or processes, describing behavior of objects that may raise security threats, may (or must) cause adequate security measures and may require various levels of reporting.

The most typical activity format is a directed path on the Event Graph, representing subsequent security events for an external or an internal object. The length of such a path may depend on the density of sensor units, frequency of capturing object attributes and interactions between different objects, such as appearing in the proximity of a security hazard hotspot, ringing a doorbell, leaving a landing platform, starting/ending inspection's video stream, etc.

More complex activities may include combinations of object path(s) and other interactions between single or multiple external and internal objects, for example, two individuals walking jointly around the house, then splitting their paths, followed by dispatching a UAV to keep inspecting both individuals as long as the UAV provides a sufficient video quality, and then switching to inspecting the individual who is closer to the house.

The phase of identifying and monitoring activities may include specific transformations of the Event Graph, such as:
  Detecting and discarding singular events, as explained elsewhere herein.
  Identifying resumed (after being temporarily suspended) activities.
  Recognizing repetitive events/paths/actions by external objects, such as an individual walking back and forth around the home.

Conducting semantic analysis and building activity descriptors. Semantic analysis of activities that have been detected at the previous phase pursues two different but interrelated goals: filtering/prioritizing the activities with respect to corresponding security threats and building activity descriptors for the subsequent synthesis of natural language descriptions.

Semantic analysis compresses activities to essential, key events of the activities, eliminating intermediate events. Key events may be associated with an object (a person, an animal, a vehicle or an unidentified object) approaching, interacting with or repetitively crossing the space near a security hazard hotspot; with the first detection of a new object by sensors, such as a vehicle first crossing a property gate when entering the property or leaving the property through the gate. Key events may also be generated by internal objects, for example, opening the Hive UAV landing platform, starting the Bee multicopter flight, reaching a target position by the multicopter and attaining a view of a potential security hazard, landing of the Bee on the Hive, etc.

For example, a walk of an unknown person through a property may be compressed to three key events:
  First appearance at the property gate.
  Reaching the front door.
  Ringing the doorbell.

In a similar way, an inspection flight of a UAV may be reduced to the following key events:
  Leaving the landing platform.
  Attaining view of an external object and starting video transmission.
  Ending video transmission.
  Returning to the landing platform.

The sequence of key events may serve as a descriptor for an activity.

Building activity descriptions in natural language. The system may convert activity descriptors into natural language descriptions using, for example, template-based grammar with a limited set of constructs, such as time/location/object type/action/connector, for example:
  At 5:30 pm [time] a person [object type] walked [action] from the gate [location] to the front door [location] and [connector] rang the bell [action] at 5:33 pm [time].
  At the same time [timing reference] the UAV [object type] took off [action] from the landing platform [location] and [connector] inspected [action] the front door [location] at 5:34 pm [time].

Reporting. Activity descriptions may be presented to owners on demand (for example, on verbal requests to Alexa, Google Play, Siri or other voice-enabled assistants) or as mandatory notifications, in real-time or buffered/archived, in visual (text, pictogram and other presentations) of in synthesized voice formats, as periodic reports or conversational style notifications.

BRIEF DESCRIPTION OF THE DRAWINGS

Embodiments of the system described herein will now be explained in more detail in accordance with the figures of the drawings, which are briefly described as follows.

FIGS. 4A-4D are schematic illustrations of different event types, according to an embodiment of the system described herein.

DETAILED DESCRIPTION OF VARIOUS EMBODIMENTS

The system described herein provides the system and technique for capturing property security data from multiple sources, identifying and categorizing security events and associated activities, generating natural language descriptions of activities and presenting the descriptions as notifications or reports to the property owner in a visual and/or synthesized audio format.

Figure 1:
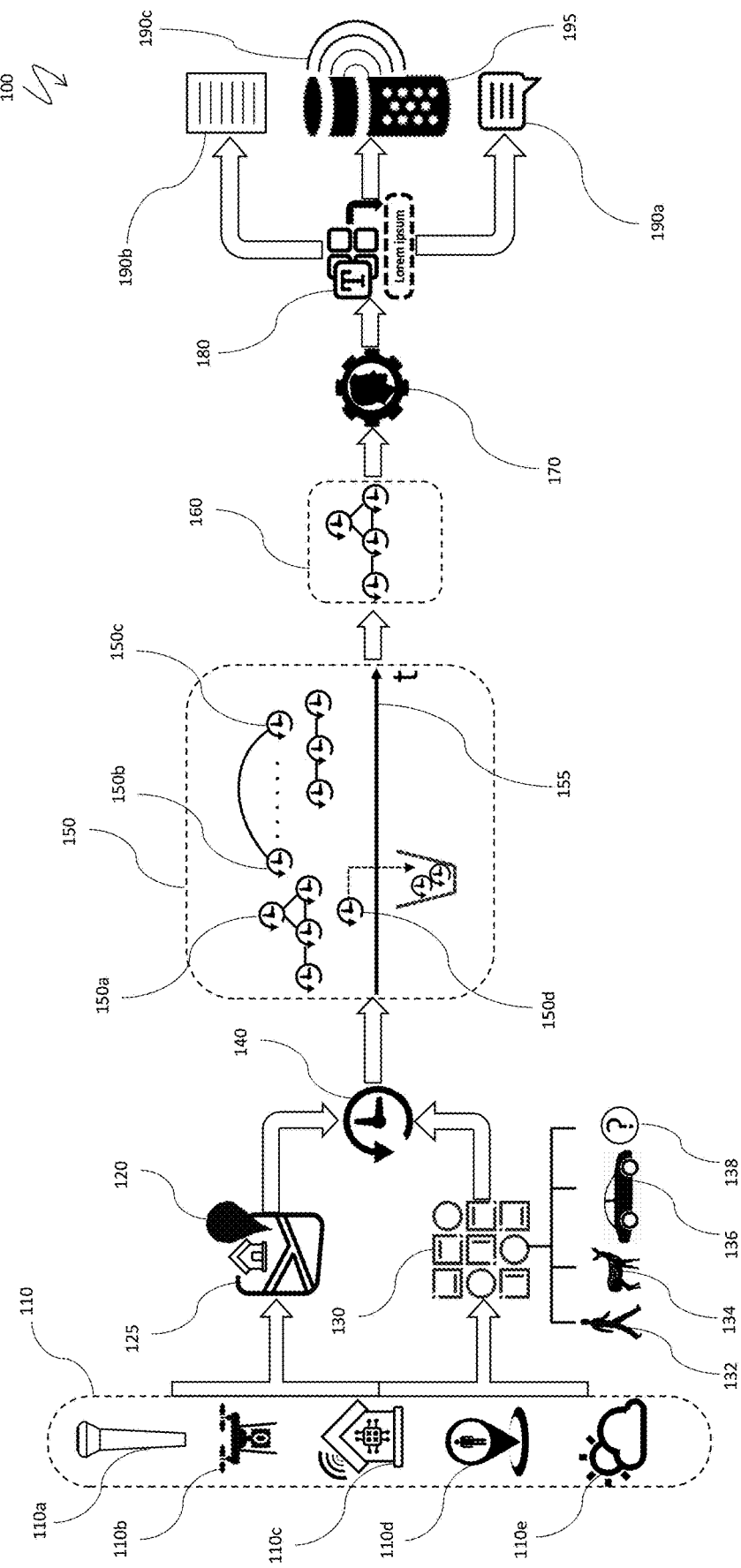
FIG. 1 is a schematic illustration of architecture and workflow of a system that captures and analyzes security events and activities and generates natural language descriptions, according to an embodiment of the system described herein.

FIG. 1 is a schematic illustration 100 of system architecture and workflow. Data collection methods used by the system may include one or more sensor units 110a, a multicopter 110b, a smart home with multiple sensors, networks and other hardware and software 110c, presence detection mechanisms 110d, explained elsewhere herein, and weather forecast information 110e. For every discovered object, the system determines object location 120 on a property map 125 and provides static or dynamic object information to an object classification component 130, which may identify an object as a human 132, an animal 134, a vehicle 136 or report an unknown object type 138. Some objects observed by the system may generate events 140, which may be added to an event graph 150 on a timeline 155 thereof, which may lead to various situations: a new event may be added to a sequence of connected events 150a, may be qualified as a suspended event 150b or a resumed event 150c, or may be discarded as illustrated by an event 150d.

The connected events 150a may mature into activities 160, which may be subsequently studied by a semantic analysis component 170, which, in its turn, may transfer one or more of the activities 160 to a natural language description engine 180 for generating natural language notifications 190a and reports 190b that may be presented to a property owner (or agent thereof) in a text format or as synthesized speech 190c that may be played on demand or otherwise by a smart speaker 195.

Figure 2:
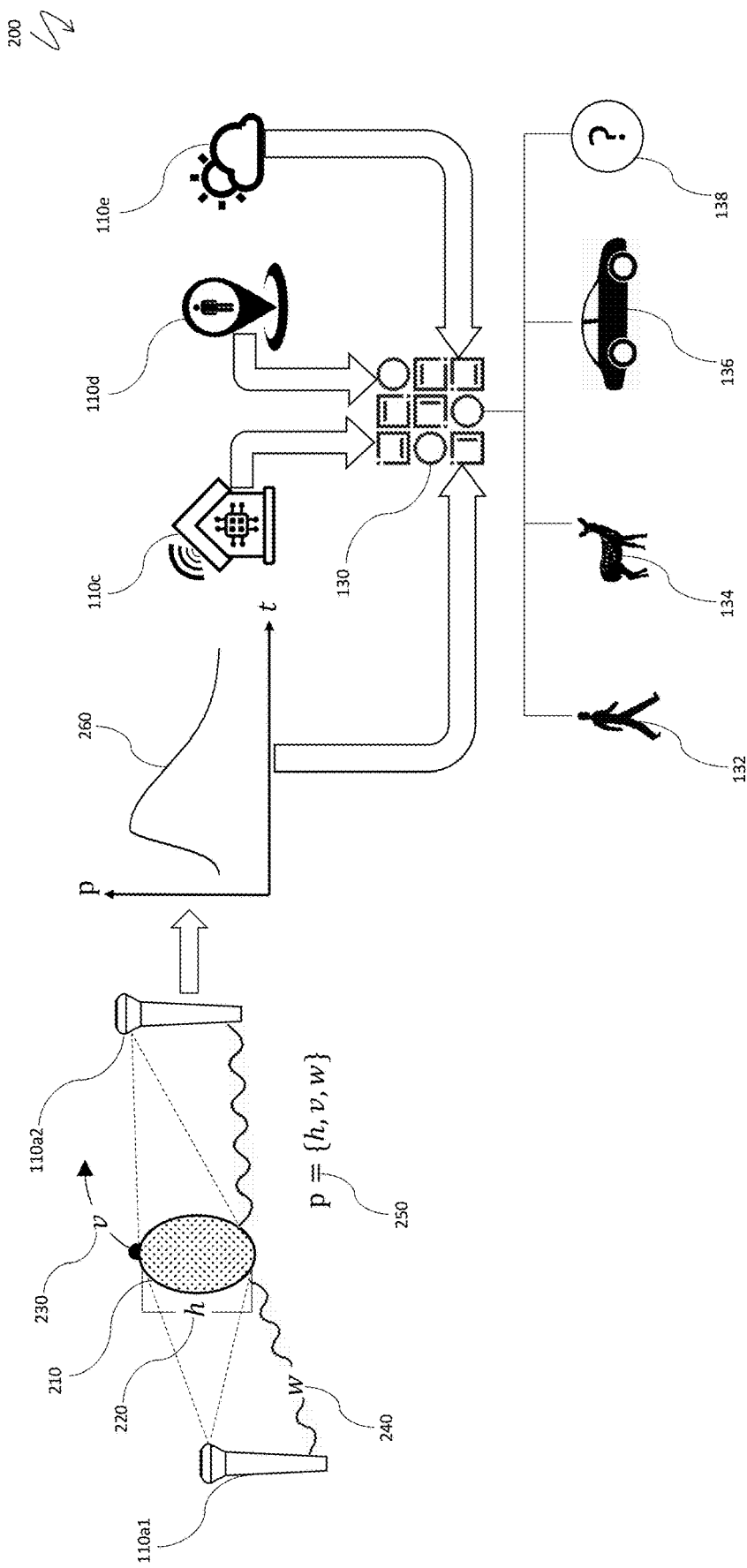
FIG. 2 is a schematic illustrations of object identification and classification, according to an embodiment of the system described herein.

FIG. 2 is a schematic illustration 200 of object identification and classification. Two sensor units 110a1, 110a2 are tracking an object 210 and dynamically assessing a height 220 of the object 210, a velocity 230 of the object 210 and vibration characteristics 240 of the object 210, which are combined into an object sensor profile 250, which results in a dynamic object profile 260. The dynamic object profile 260 represents one input to the classifier 130; by adding optional information about the object 210 captured by the smart home sensors 110c, presence detection mechanisms 110d and the weather forecast 110e, the system may build a comprehensive input for the classifier 130, which may subsequently assign the object 210 to one of a plurality categories for the classifier 130, such as the human 132, the animal 134, the vehicle 136 or the unknown object 138.

Figure 3:
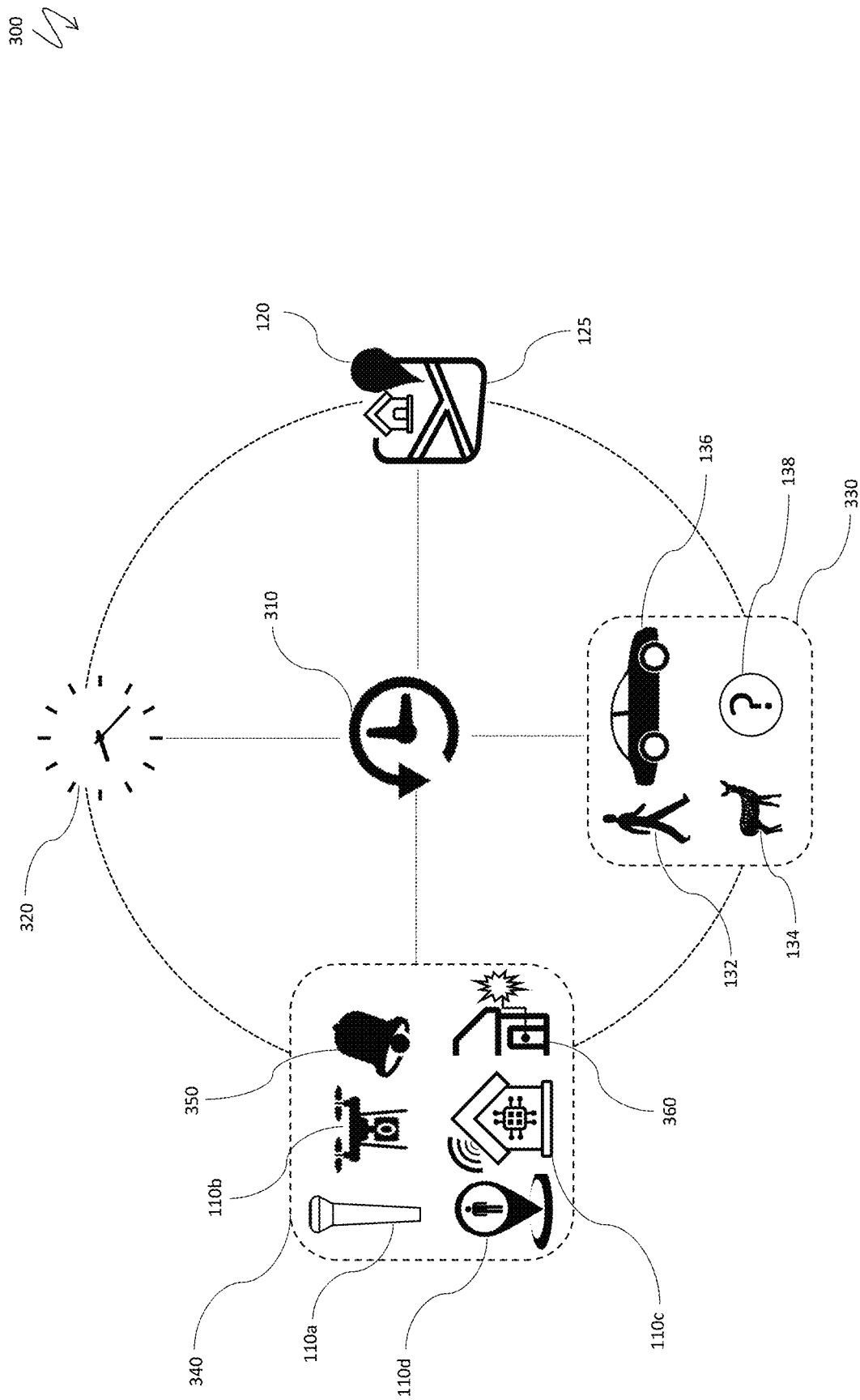
FIG. 3 is a schematic illustration of event attributes, according to an embodiment of the system described herein.

FIG. 3 is a schematic illustration 300 of event attributes, representing informational components of an event description. Once an event 310 is identified by the system, attributes of the event 310 may include all or some of the following parameters: a time stamp 320; the location 120 on the property map 125; an object category 330 associated with the event 310 with a value range corresponding to the human 132, the animal 134, the vehicle 136 and the unknown object 138; and one or more associated internal objects, such as one or more of the sensor units 110a, the multicopter 110b, the smart home system 110c, the presence detection mechanism 110d, a door bell or other signal 350 and a security hazard hotspot 360, for example, a front or garage door or a front or back window. When an event includes multiple objects, object attributes may be captured separately for each relevant object.

FIGS. 4A-4D are schematic illustrations of different event types.

FIG. 4A schematically illustrates a singular event where a branch 417 falls from a tree 410 on a property broken off by a strong wind 415.

FIG. 4B is a schematic illustration of connected events. Part of a property shown in FIG. 4B includes a house 420 with a front door 422, a garage door 424, a driveway 426 and a hedge 428. A vehicle enters the property via a driveway (an event 430) and stops near the garage door 424 (an event 430'). A person leaves the vehicle and walks along a wall to the front door 422 (events 440, 400'), which is captured by a sensor unit 110a3. The two events 430, 430' associated with a vehicle (entry and parking) and the two events 440, 440' associated with the person who exited the vehicle are connected and the system logic identifies the connected events as such.

FIG. 4C is another schematic illustration of connected events. A person walks through a property area inside the hedge 428 and is detected by a sensor unit 110a4, as shown by an event 440a associated with the person. According to system logic, the multicopter 110b is routed for inspection of a potential intruder. This causes a multicopter platform 450 to open (an event 440b associated with the multicopter platform 450) and the multicopter 110b flies along a trajectory 460 and reaches a target position observing the person as shown by a view angle 470, which is recorded by the system as an event 440c associated with the multicopter 110b and an event 440a' with the person. The events 440a, 440a', 440b, 440c form a sequence of connected events.

FIG. 4D is a schematic illustration of repetitive events. A property area includes the house 420 with the front door 422, the driveway 426 and the hedge 428. The property area has an installed sensor unit 110a5, which may detect and track, on par with other sensor units not shown in FIG. 4D, various objects on the property area. A person enters the property area through the driveway 426 and walks back and forth around the house 420, as shown by arrows 480 and by a sequence of events 440d, 440e, 440f identified as the repetitive events.

Figure 5:
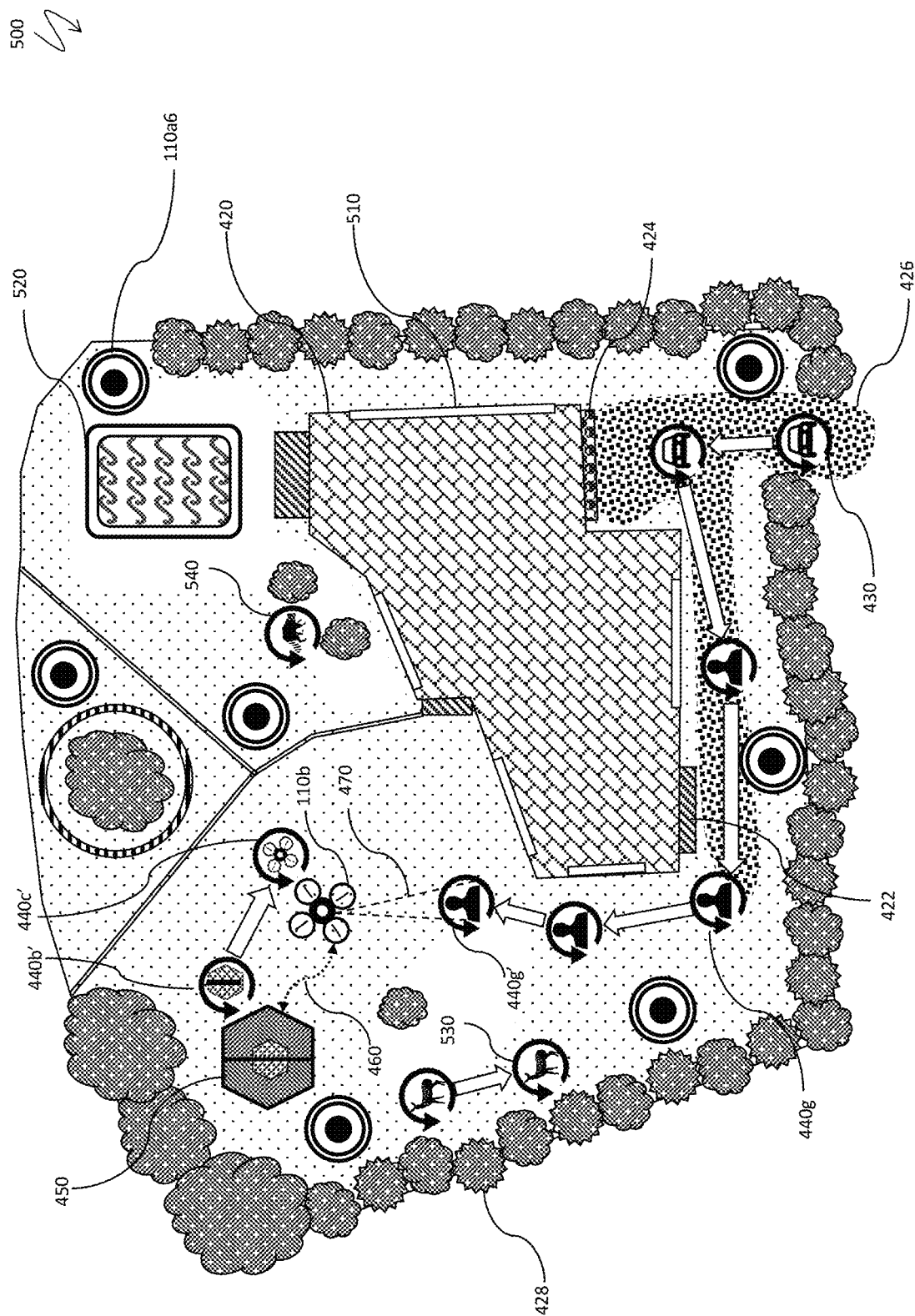
FIG. 5 is a schematic illustration of activities and events on a property, according to an embodiment of the system described herein.

FIG. 5 is a schematic illustration 500 of activities and events on a property. The property includes the house 420 with the front door 422, the garage door 424, a large window 510, the driveway 426 and a pool 520; the property is mostly surrounded by the hedge 428. There are multiple sensor units installed on the property, including a sensor unit 110a6. The multicopter 110b with the landing platform 450 allow aerial video inspections of the property.

A vehicle has entered the property and stopped near the garage, which is depicted by the starting event 430 related to the vehicle object; the vehicle activity may form a short activity with two events shown in FIG. 5. Subsequently, a vehicle driver or passenger came out of the vehicle and started walking along the property; this is shown by a sequence of events associated with a human object, two of which, 440g and 440g', are marked in FIG. 5.

Once an event 440g occurs and the person, who is unknown, turns a corner and moves further into the property, the system deploys the multicopter 110b for inspection (see FIG. 4C and the accompanying text), which causes a Hive (the multicopter platform 450) to open and release a Bee (the multicopter 110b) to fly along the trajectory 460 to reach a target position for observation and video inspection (the view angle 470). This causes several connected events, as explained elsewhere herein, and activity by the multicopter 110b may be marked by a starting event 440b' and an intermediate event 440c'.

Tracking the unknown person, including a multicopter inspection, is not the only activity occurring on the property. An event 530 associated with an animal that has been subsequently recognized as a deer, may mark a start of an activity that might be reportable in instances where the deer is suspected to be damaging the property (for example, eating blossoms near a hedge or in other parts of the property). Another event 540 associated with an animal object may also be tracked as a potentially harmful (digging holes and damaging the grass cover of the property).

Figure 6:
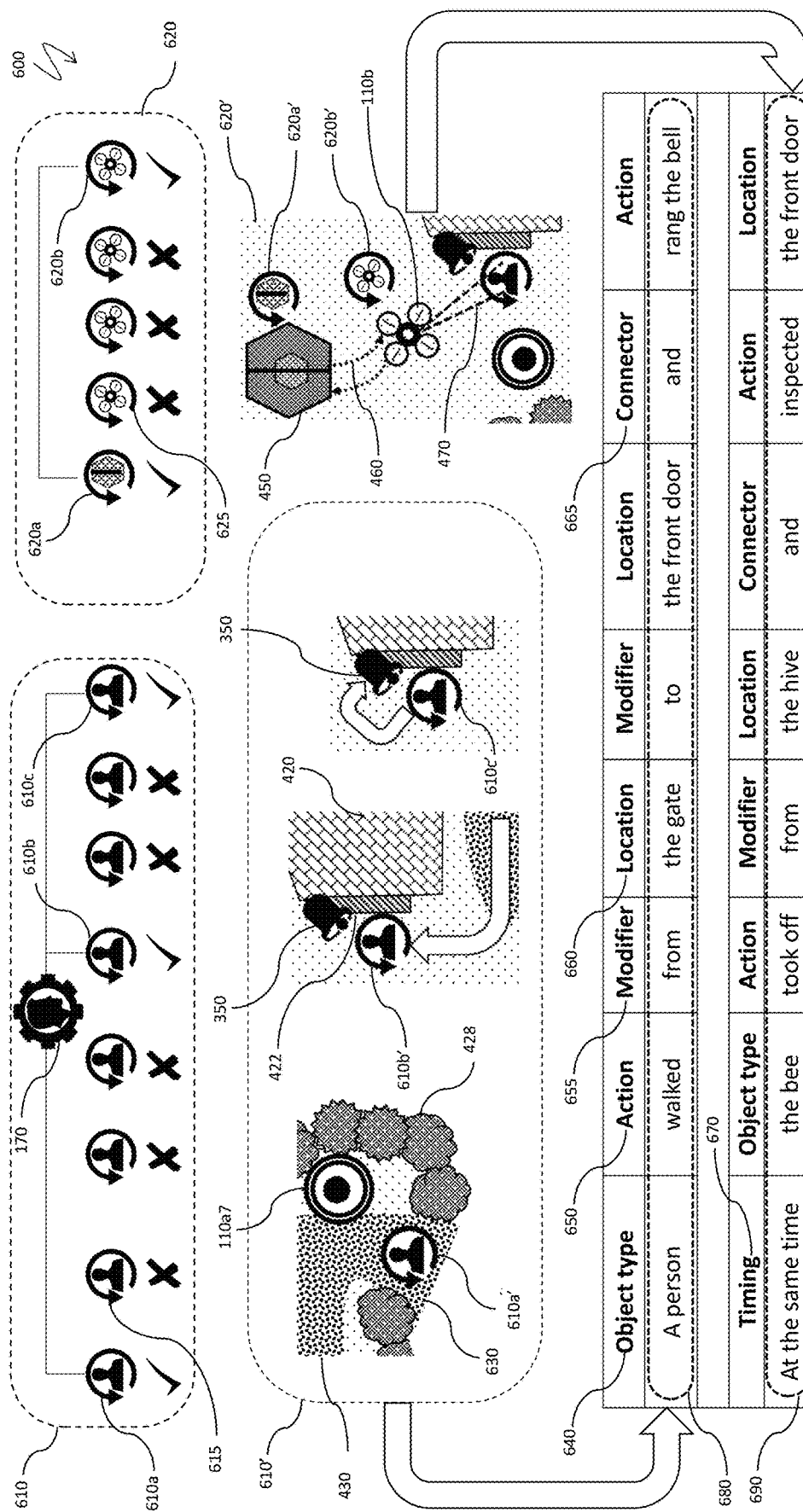
FIG. 6 is a schematic illustration of generating template-driven natural language descriptions of activities, according to an embodiment of the system described herein.

FIG. 6 is a schematic illustration 600 of generating template-driven natural language descriptions of activities. Each of two activities 610, 620 initially includes multiple connected events. Corresponding event sequences may be compressed by the semantic analysis component 170, as explained elsewhere herein, retaining only key events 610a, 610b, 610c, 620a, 620b and dropping intermediate less significant events 615, 625. The activities 610, 620 and the key events 610a, 610b, 610c, 620a, 620b are further illustrated by pictograms 610', 620' as follows:

The pictogram 610' includes three parts, each illustrating one key event of the activity 610. Specifically, a first part shows the initial event of the activity 610. An unknown person is entering a driveway (the event 430) on a property through a gate 630 made in the hedge 428. The person is detected by a sensor unit 110a7, which corresponds to an event 610a', a graphical illustration of the event 610a. The second part shows the next key event of the activity 610. Here, the unknown person walks around the house 420 and reaches the front door 422 with the doorbell 350, which corresponds to an event 610b', a graphical illustration of the event 610b. The final third part of the pictogram 610' shows the unknown person ringing the doorbell 350, which is captured by the system as an event 610c', a graphical representation of the event 610c.

The pictogram 620' illustrates the activity 620 on one image. Once the unknown person has reached the front door 422, the system logic decides to dispatch the multicopter 110b for an inspection flight. This includes opening the landing platform (hive) 450 so the multicopter 110b departs and travels along the aerial trajectory 460 until the multicopter 110b can clearly view the unknown person from the target position, as shown by the view angle 470. This activity corresponds to two key events 620a', 620b', the graphical representations of the key events 620a, 620b.

The bottom portion of FIG. 6 illustrates template-driven generation of natural language description of activities based on key events. Several types of template positions and fields are explained as object types 640, action names 650, modifiers 655, locations 660, logical connectors 665, and temporal (timing) expressions 670. Examples of natural language descriptions of activities as sequences of key events are presented by phrases 680, 690.

Figure 7:
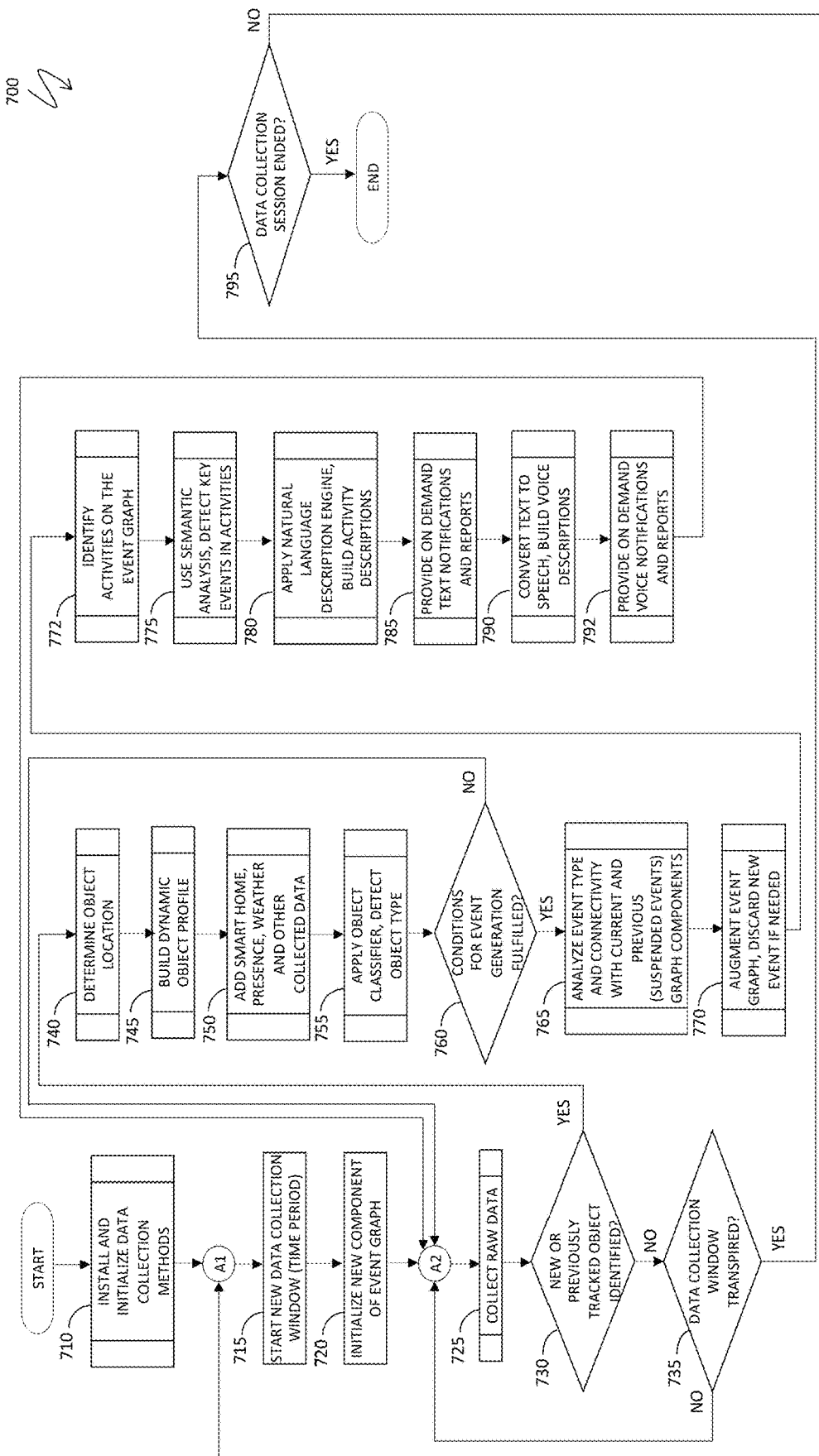
FIG. 7 is a system flow diagram illustrating system functioning in connection with data collection, identification and analysis of events and activities and generating corresponding natural language descriptions, according to an embodiment of the system described herein.

Referring to FIG. 7, a system flow diagram 700 illustrates system functioning in connection with data collection, identification and analysis of events and activities and generating their natural language descriptions. Processing begins at a step 710, where data collection mechanisms are installed and initialized, as explained elsewhere herein (see, in particular, FIG. 1 and the accompanying text). After the step 710, processing proceeds to a step 715, where a new data collection window is started. After the step 715, processing proceeds to a step 720, where the system initializes a new component of an event graph. After the step 720, processing proceeds to a step 725, where the system collects raw data captured by the data collection mechanisms. After the step 725, processing proceeds to a test step 730, where it is determined whether a new or previously tracked object has been identified. If not, processing proceeds to a test step 735, where it is determined whether the data collection window has transpired. If not, processing proceeds to the step 725, which may be independently reached from the step 720; otherwise, processing proceeds to a test step 795, where it is determined whether the data collection session ended. If so, processing is complete; otherwise, processing proceeds to the step 715, which may be independently reached from the step 710.

If it is determined at the test step 730 that a new or previously tracked object has been identified, processing proceeds to a step 740, where the object location is determined. After the step 740, processing proceeds to a step 745, where the system builds a dynamic object profile, as explained elsewhere herein (see, in particular, FIG. 2 and the accompanying text). After the step 745, processing proceeds to a step 750, where smart home, presence, weather and other data are added to the object description (as explained, in particular, in connection with FIG. 2). After the step 750, processing proceeds to a step 755, where the system applies an object classifier to detect an object type (see FIG. 2). After the step 755, processing proceeds to a test step 760, where it is determined whether the conditions for event generation are fulfilled, as explained elsewhere herein. If not, processing proceeds to the step 725, which may be independently reached from the step 720 and the test step 735; otherwise, processing proceeds to a step 765, where the system analyzes the event type and connectivity with the current and previous components of the event graph (the previous components may be associated with previously suspended events), as explained, in particular, in connection with FIG. 1 and is exemplified by FIGS. 4B, 4C. After the step 765, processing proceeds to a step 770, where the system augments the event graph, discarding and potentially suspending the new event. After the step 770, processing proceeds to a step 772, where the system identifies activities on the event graph (see, for example, FIGS. 1, 5, 6). After the step 772, processing proceeds to a step 775, where the system uses semantic analysis to detect key events in activities (see, in particular, FIG. 6 and the accompanying text). After the step 775, processing proceeds to a step 780, where the natural language description engine is applied, and activity descriptions are built (an example of the template based natural language description engine and two activity descriptions are provided in FIG. 6 and the accompanying text).

After the step 780, processing proceeds to a step 785, where the system provides on demand text notifications and reports, as explained elsewhere herein, including FIG. 1. After the step 785, processing proceeds to a step 790, where the text may optionally be converted to a synthesized speech and voice descriptions of activities are created (see, in particular, FIG. 1 and the accompanying text). After the step 790, processing proceeds to a step 792, where the system provides on demand voice notifications and reports. After the step 792, processing proceeds to a step 725, which may be independently reached from the step 720 and the test steps 735, 760

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functions may vary from the illustrations presented herein. Further, various aspects of the system described herein may be implemented using various applications and may be deployed on various devices, including, but not limited to smartphones, tablets and other mobile computers. Mobile devices, such as smartphones and tablets, may use operating system(s) selected from the group consisting of: iOS, Android OS, Windows Phone OS, Blackberry OS and mobile versions of Linux OS. Mobile computers and tablets may also use operating system selected from the group consisting of Mac OS, Windows OS, Linux OS, Chrome OS. Portions of the system may be implemented on cloud servers and communicate with mobile devices and vehicles via wireless connections.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of detecting security events and generating corresponding natural language descriptors, comprising:
monitoring an area to capture data corresponding to moving objects in the area;
classifying the moving objects;
generating events based on classifying the moving objects;
building an event graph by connecting related ones of the events;
using the event graph to detect security events; and
building natural language activity descriptors for the security events of the event graph using semantic analysis to filter and prioritize the events with respect to corresponding security threats and using natural language templates that include a plurality of constructs to convert filtered and prioritized ones of the security events to create natural language phrases.

2. The method, according to claim 1, wherein the natural language security descriptors are presented using at least one of: a verbal request to a voice-enabled assistant, a mandatory notification by the voice-enabled assistant, periodic reports and/or conversational style notifications in a visual format.

3. The method, according to claim 1, wherein data is captured using at least one of: sensors, video streams from at least one camera vehicle, smart home devices, presence detection mechanisms, and weather data and forecasts.

4. The method, according to claim 3, wherein the sensors include at least one of: PIR, vibration, light, laser, ultrasonic, seismic, and radar sensors.

5. The method, according to claim 1, wherein classifying the moving objects includes determining a dynamic sensor profile for each of the moving objects.

6. The method, according to claim 5, wherein the dynamic sensor profile includes object size, object velocity and object vibration pattern.

7. The method, according to claim 5, wherein the dynamic sensor profile is input to a pre-trained object classifier that returns an object category corresponding to one of: human, animal, vehicle, or uncategorized.

8. The method, according to claim 1, wherein each of the events has attributes associated therewith and wherein the attributes include event time, event location, an event motion vector, an event object category, associated internal objects and associated external objects.

9. The method, according to claim 8, wherein the attributes are used to determine whether a particular one of the events is classified as a security event.

10. The method, according to claim 1, wherein related ones of the events are connected based in part on timing between the events.

11. The method, according to claim 1, wherein the event graph is used to select activities that are monitored to determine if events corresponding to the activities are security events.

12. The method, according to claim 1, wherein each of the constructs is one of: a time construct, a location construct, an object type construct, an action construct, a temporal expression, a modifier or a logical connector.

13. The method, according to claim 1, wherein using the event graph to detect security events includes classifying events as connected events that are causally connected or singular events that are not and wherein connected events are more likely to be security events.

14. The method, according to claim 13, wherein at least some repetitive events are classified as connected events.

15. The method, according to claim 13, wherein connectivity rules require that connected events occur within a relatively narrow time window.

16. The method, according to claim 15, wherein the relatively narrow time window is 30 seconds.

17. The method, according to claim 15, wherein a relatively narrow time window is three times an average interval between adjacent events within a same activity.

18. The method, according to claim 1, wherein only key events are used to build natural language activity descriptors for the security events.

19. The method, according to claim 1, wherein security events include a vehicle driving on to the area and a person exiting the vehicle and walking toward a front door of a house in the area.

20. The method, according to claim 1, wherein security events include a person entering the area and walking back and forth in the area.

21. The method, according to claim 1, wherein security events include a person approaching or interacting with a predefined security hazard hotspot that is within the area.

22. The method, according to claim 21, wherein a predefined security hazard hotspot includes at least one of: a property gate, a house door, a garage door, a window, and a doorbell.

23. The method, according to claim 1, wherein at least some security events correspond to activities that are initially suspended and subsequently resumed.

24. The method, according to claim 1, wherein an unmanned aerial vehicle with a camera is dispatched to more closely inspect security events.

25. A non-transitory computer readable medium containing software that detects security events and generates corresponding natural language descriptors, the software comprising:

executable code that monitors an area to capture data corresponding to moving objects in the area;

executable code that classifies the moving objects;

executable code that generates events based on classifying the moving objects;

executable code that builds an event graph by connecting related ones of the events;

executable code that uses the event graph to detect security events; and executable code that builds natural language activity descriptors for the security events of the event graph using semantic analysis to filter and prioritize the events with respect to corresponding security threats and using natural language templates that include a plurality of constructs to convert filtered and prioritized ones of the security events to create natural language phrases.

26. The method, according to claim 1, wherein the natural language phrases include separate components that are generated by classifying the events according to at least one of: object type, action name, modifier, location, logical connector, and temporal expression.

* * * * *